United States Patent
Sano et al.

(10) Patent No.: US 6,903,922 B2
(45) Date of Patent: Jun. 7, 2005

(54) CHIP TYPE CAPACITOR, METHOD FOR PREPARING THE SAME AND ANODE TERMINAL USED FOR PREPARING THE SAME

(75) Inventors: Mitsunori Sano, Miyagi (JP); Takashi Kono, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

(21) Appl. No.: 10/387,397

(22) Filed: Mar. 14, 2003

(65) Prior Publication Data

US 2003/0174460 A1 Sep. 18, 2003

(30) Foreign Application Priority Data

Mar. 15, 2002 (JP) ........................................ 2002-071997

(51) Int. Cl.[7] ........................... H01G 4/228; H01G 9/04
(52) U.S. Cl. ....................................... 361/533; 361/528
(58) Field of Search ....................... 361/523, 528–529, 361/531, 532–535, 538–540

(56) References Cited

U.S. PATENT DOCUMENTS

| | | | |
|---|---|---|---|
| 3,828,227 A | * | 8/1974 | Millard et al. ............... 361/540 |
| 4,097,915 A | * | 6/1978 | Locke .......................... 361/540 |
| 5,736,710 A | | 4/1998 | Ikeda et al. |
| 6,141,205 A | | 10/2000 | Nutzman et al. |
| 6,193,765 B1 | | 2/2001 | Nakanishi et al. |
| 6,236,561 B1 | | 5/2001 | Ogino et al. |
| 2003/0151884 A1 | * | 8/2003 | Matsumoto ................. 361/523 |

FOREIGN PATENT DOCUMENTS

| | | | | |
|---|---|---|---|---|
| DE | 3931266 A1 | * | 9/1989 | ............ H01G/1/14 |
| JP | 6-196349 | * | 7/1994 | ............ H01G/1/14 |
| JP | 3-848895 B2 | | 7/2000 | |
| JP | 2001-267180 A | | 9/2001 | |

* cited by examiner

Primary Examiner—Eric W. Thomas
(74) Attorney, Agent, or Firm—Sughrue Mion, PLLC (57) ABSTRACT

A chip type capacitor which has improved bond strength between an anode lead wire and an anode terminal and enhanced reliability, and a method for preparing the chip type capacitor and an anode terminal. The chip type capacitor has a solid electrolytic capacitor element including an element body having an anode body, a dielectric and a cathode body, and an anode lead wire partially extending from the anode body of the element body. An anode terminal is electrically connected to the portion of the anode lead wire extending from the anode body. This extending portion of the anode lead wire has about 75% or more of its periphery, in the direction substantially perpendicular to the extending direction of the anode lead wire, covered with solidified matter resulting from solidification of a melt, thereby bonding the anode terminal and the anode lead wire to each other.

7 Claims, 8 Drawing Sheets

CHIP TYPE CAPACITOR, METHOD FOR PREPARING THE SAME AND ANODE TERMINAL USED FOR PREPARING THE SAME

BACKGROUND OF THE INVENTION

1. Field of the Invention

The present invention relates to a chip type solid electrolytic capacitor, a method for preparing the same, and an anode terminal used in the preparation method.

2. Description of the Related Art

A chip type solid electrolytic capacitor (hereinafter often referred to simply as "chip type capacitor") is in the form of a chip comprising, as its core, a capacitor element having an anode-dielectric-cathode structure. More specifically, the capacitor element has a structure comprising an anode made of a metal exhibiting valve action (valve metal), an oxidized layer as a dielectric layer formed over the surface of the anode, an electrolyte layer formed on the dielectric layer, and a cathode in the form of an electrically conductive layer formed on the electrolyte layer.

In this connection, the valve metal means a metal capable of forming an oxidized layer whose thickness can be controlled by anodic oxidation. Specifically, valve metal includes niobium (Nb), aluminum (Al), tantalum (Ta), titanium (Ti), hafnium (Hf) and zirconium (Zr). Actually, however, aluminum, tantalum and niobium are mainly used.

With respect to Al, a foil is generally used as the anode, and with respect to Ta and Nb, a porous body prepared by sintering a Ta- or Nb-based powder is used as the anode.

Of those solid electrolytic capacitors, a chip type capacitor comprising a porous sintered body as an anode is particularly adaptable to miniaturization and capable of being adapted to have a high capacity, and hence there is strong demand therefor as a part which meets needs of miniaturization of a cellular phone, information terminal equipment or the like.

In recent years, for further miniaturization, there has frequently been employed such a structure of a chip type capacitor that electrodes (an anode and a cathode) are exposed only in the bottom surface of the chip type capacitor.

Specifically, the structure is different from a theretofore employed structure in which each of the electrodes is exposed from a side surface and led to the bottom surface by bending in that a capacitor element incorporated therein is so disposed as to bridge the anode terminal and the cathode terminal (so-called "face down structure").

By employing such a structure (face down structure), further miniaturization of a chip type capacitor is realized, and possibility of occurrence of short circuits between the electrodes and other electronic parts mounted around the electrodes is reduced. As a result, packaging density is increased.

A chip type capacitor having such a conventional face down structure and a method for the preparation thereof are disclosed, for example, in Japanese Patent No.3084895 by Sano et al. and in Japanese Unexamined Patent Publication No.2001-267180 by Narita et al. In this preparation method, an anode lead wire of a capacitor element having a capacitor body and the anode lead wire extending from the capacitor body is rested on an anode terminal. The anode terminal has a portion bent to form a connecting portion, and the connecting portion and the anode lead wire are welded together with a laser beam.

When the anode lead wire and the connecting portion of the anode terminal of the capacitor are bonded to each other by the above-mentioned method, a relatively high bond strength can be obtained although the bond is made in a narrow area corresponding to the thickness of the anode terminal.

However, the above-mentioned method does not always provide a sufficient surface area of the bond between the anode lead wire and the anode terminal. Further, the method does not stably provide a sufficient diffusion layer formed including a bonded area after the welding step. For these reasons, capacitors having insufficient bond strength are likely to be yielded.

If the bond strength is insufficient, the anode lead wire and the connecting portion of the anode terminal which have been bonded together are disconnected in a step for mounting the capacitor on a substrate. This is because the mounting step is a heat applying step, and a sheathing resin filled between the element body and the anode terminal is expanded by influence of the heat to exert pushing forces on the anode body of the element body and the connecting portion of the anode terminal in such directions that the anode lead wire and the connecting portion are brought apart from each other. Such a capacitor of which the anode lead wire and the connecting portion that have been bonded together are disconnected is often called an "open defectiveness" capacitor and does not function as a capacitor.

Further, it is difficult to check from an appearance of a bonded area whether a capacitor has an "open defectiveness" or not. Accordingly, presence or absence of an "open defectiveness" has influence on reliability of electronic equipment.

SUMMARY OF THE INVENTION

It is an object of the present invention to solve the problems related to the above-mentioned "open defectiveness" and to provide a chip type capacitor having improved bond strength between the anode lead wire and the anode terminal and enhanced reliability, and a method for preparing the same, and an anode terminal used in the preparation method.

According to an aspect of the present invention, there is provided a chip type capacitor comprising:

a solid electrolytic capacitor element including an element body having an anode body, a dielectric and a cathode body, and an anode lead wire partially extending from the anode body of the element body; and an anode terminal electrically connected to the anode lead wire, said anode lead wire having such a site that about 75% or more of a periphery of a section thereof in the direction substantially perpendicular to the extending direction of the anode lead wire is covered with solidified matter resulting from solidification of a melt, said anode terminal and said anode lead wire being bonded to each other by the solidified matter.

The chip type capacitor having the anode lead wire and the anode terminal which are bonded to each other in such state has an increased surface area of the bonded area between the anode lead wire and the anode terminal and thus has increased bond strength in the bonded area, as compared with a conventional chip type capacitor. Accordingly, the chip type capacitor according present invention is less likely to have so-called "open defectiveness" and has enhanced reliability as a part.

According to another aspect of the present invention, there is provided an anode terminal used for preparing a chip type capacitor comprising a solid electrolytic capacitor element including an element body having an anode body, a dielectric and a cathode body, and an anode lead wire partially extending from the anode body of the element body; said anode terminal having a recess for resting the extending portion of the anode lead wire and at least one protrusion located beside the recess and above the level of the top of the extending portion of the anode lead wire rested on the recess, said protrusion being melted to supply the resulting melt to the upper surface portion of the extending portion of the anode lead wire, said melt being allowed to solidify to electrically connect the anode terminal to the anode lead wire to form a bond and an electrical connection between the anode terminal and the anode lead wire.

By employing the anode terminal having such a structure, the extending portion of the anode lead wire has such a site that about 75% or more of a periphery of a section thereof in the direction substantially perpendicular to the extending direction of the anode lead wire is covered with solidified matter resulting from solidification of the melt obtained by heating the protrusion of the anode terminal. The chip type capacitor having such a structure is less likely to have "open defectiveness" and has enhanced reliability.

According to still another embodiment of the present invention, there is provided a method for preparing a chip type capacitor comprising a solid electrolytic capacitor element having an anode lead wire partially extending therefrom; said method using an anode terminal having a recess for resting the extending portion of the anode lead wire and at least one protrusion located beside the recess and above the level of the top of the extending portion of the anode lead wire when the extending portion is rested thereon, said method comprising: resting the extending portion of the anode lead wire on the recess in such a manner that the anode lead wire is substantially perpendicular to the recess of the anode terminal; melting the protrusion by a means for heating to form a melt; allowing the melt to flow down by gravity to supply the melt to the upper surface portion of the extending portion of the anode lead wire; and allowing the melt to solidify to bond the extending portion of the anode lead wire and the anode terminal to each other with the resulting solidified matter.

The manner of the resting of the extending portion of the anode lead wire on the recess may otherwise be expressed. In other words, the resting of the extending portion of the anode lead wire on the recess is conducted in such a manner that a periphery of a section of the anode lead wire in the direction substantially perpendicular to the extending direction of the anode lead wire has a site in contact with the recess By employing the method, the protrusion of the anode terminal heated into a melt by the heating means such as a laser beam, an ion beam, arc discharge or the like is effectively supplied to gaps between the anode lead wire and the recess and the upper surface portion of the anode lead wire. Consequently, the extending portion of the anode lead wire has such a site that about 75% or more of a periphery of a section thereof in the direction substantially perpendicular to the extending direction of the anode lead wire is covered with solidified matter resulting from solidification of the melt derived from the protrusion of the anode terminal. The chip type capacitor having such a structure is less likely to have "open defectiveness" and has enhanced reliability.

According to a further embodiment of the present invention, there is provided a method for preparing a chip type capacitor comprising a solid electrolytic capacitor element having an anode lead wire partially extending therefrom; said method using an anode terminal having a recess for resting the extending portion of the anode lead wire and at least one protrusion located beside the recess and above the level of the top of the extending portion of the anode lead wire when the extending portion is rested thereon, said method comprising: resting the extending portion of the anode lead wire on the recess in such a manner that the anode lead wire is substantially perpendicular to the recess of the anode terminal; melting the protrusion by a means for heating to form a melt; allowing the melt to flow down by gravity to supply the melt to the upper surface portion of the extending portion of the anode lead wire while heating the upper surface portion of the anode lead wire by a means for heating; and allowing the melt to solidify to bond the extending portion of the anode lead wire and the anode terminal to each other with the resulting solidified matter.

By employing the method, the protrusion of the anode terminal heated into a melt by the heating means such as a laser beam, an ion beam, arc discharge or the like is effectively supplied to gaps between the anode lead wire and the recess and the upper surface portion of the anode lead wire. In addition thereto, since the upper surface portion of the anode lead wire is heated, the upper surface portion, i.e., the heated area is readily wetted with the melt derived from the protrusion of the anode lead wire, and the melt spreads well in substantially over the portion before it solidifies. Consequently, the extending portion of the anode terminal has such a site that about 75% or more of a periphery of a section thereof in the direction substantially perpendicular to the extending direction of the anode lead wire is covered with solidified matter resulting from solidification of the melt derived from the protrusion of the anode terminal. The chip type capacitor having such a structure is less likely to have "open defectiveness" and has enhanced reliability.

BRIEF DESCRIPTION OF THE DRAWINGS

The above-mentioned objects and other objects, embodiments and effects of the present invention will be more apparent by the following description with reference to the drawings in which.

DESCRIPTION OF THE PREFERRED EMBODIMENTS

In the following, an embodiment of the chip type capacitor according to the present invention will be described with reference to the drawings.

Figure 1:
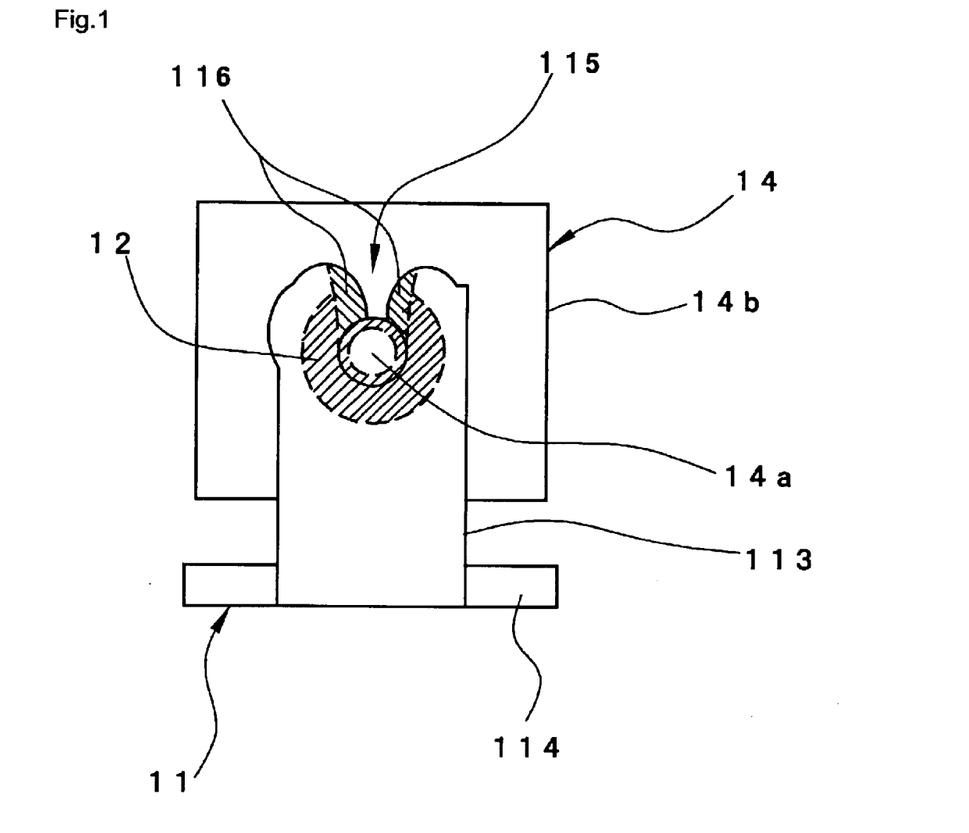
FIG. 1 is a front view schematically showing a structure of an embodiment of the chip type capacitor according to the present invention.
Figure 2:
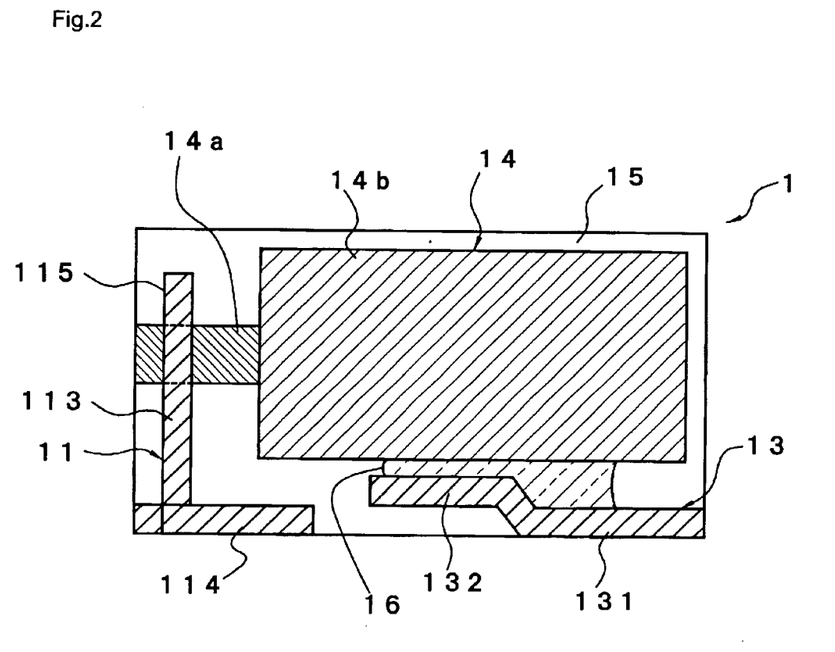
FIG. 2 is a sectional side view schematically showing the structure of the embodiment of the chip type capacitor according to the present invention.

FIG. 1 is a front view schematically showing a structure of the embodiment of the chip type capacitor according to the present invention, and FIG. 2 is a sectional side view of the structure.

The chip type capacitor 1 comprises a capacitor element 14 including an element body 14b having an anode body, dielectric and cathode body and an anode lead wire 14a partially implanted in the anode body; an anode terminal 11 electrically connected to the anode lead wire 14a; and a cathode terminal 13 electrically connected to the cathode body of the element body 14b. In this embodiment, the cathode body of the element body 14b and the cathode terminal 13 are connected via an electrically conductive adhesive 16, and the capacitor element 14 and portions of the anode terminal 11 and the cathode terminal 13 other than those for connection to external parts are sealed with a sheathing resin 15.

The element body 14b comprises an anode body made of a Ta sintered body prepared by sintering a Ta-based powder, a dielectric layer in the form of an oxidized Ta layer formed over the surface of the anode body, a solid electrolyte layer made of a pyrrole polymer and formed on the dielectric layer, and a cathode body made of graphite and formed on the solid electrolyite layer, and the element body 14b has a substantially rectangular parallelepipedonal shape.

As the materials for forming the element body 14b, there may be used other materials than those mentioned above. As the material for the anode body, there may be used niobium, aluminum or the like, besides tantalum. As the material for the solid electrolytic layer, besides a pyrrole polymer, there may be used manganese dioxide, or an electrically conductive polymer obtained by polymerizing a monomeric material such as thiophene or a derivative thereof.

The anode lead wire 14a is in the form of a Ta wire having a substantially cylindrical shape in this embodiment, and the anode lead wire is partially implanted in the Ta sintered body and the other portion thereof outward extends from the Ta sintered body.

The anode terminal 11 is a piece formed by press working of a plate having a thickness of t. The anode terminal 11 has a bottom portion 114 for connection with an external substrate or the like and a connecting portion 113 standing upward by bending at an angle of approximately 90° relative to the bottom portion 114.

In this embodiment, as the material for the anode terminal, a Ni(42%)-Fe alloy (so-called "42 alloy") which is solder-plated is used. However, other materials than this may be used. For example, copper alloys such as a Cu—Ni—Zn alloy, e.g., a German silver (45–65% Cu, 6–35% Ni, and 15–35% Zn), and a phosphor bronze (e.g., 95% Cu, 5% Sn, and 0.2% P) may be used. Further, the material for the plating may contain silver with a view to improving bonding properties.

A site of the substantially cylindrical extending portion of the anode lead wire 14a and the connecting portion 113 of the anode terminal 11 together form a junctional area 115 electrically connecting the anode terminal 11 to the anode lead wire 14a via solidified matter 116 resulting from solidification of a melt. In this junctional area, there is about 75% or more of a periphery of a section of the site in the direction substantially perpendicular to the extending portion of the anode lead wire 14a which is covered with solidified matter 116. About 75% or more means that an about ¼ upper portion of a periphery of the anode lead wire 14a, which has not been covered with solidified matter in a conventional chip type capacitor in a portion, is at least partially covered with the solidified matter 116.

While the periphery of the section of the anode lead wire 14a in the direction substantially perpendicular to the extending direction of the anode lead wire is covered with the solidified matter 116, gaps between the recess of the connecting portion 113 of the substantially flat anode terminal 11 and the anode lead wire 14a rested on the recess is filled with the solidified matter 116. In consequence, sufficient bond strength is obtained The cathode terminal 13 is a piece formed by press working of a plate made Ni(42%)-Fe alloy (so-called "42 alloy") which is solder-plated, and the cathode terminal has a bottom portion 131 and a mounting portion 132 extending at a level higher than that of the bottom portion 131 and in parallel with the bottom portion 131. To the upper surface of the mounting portion 132, the cathode body which is the peripheral layer of the capacitor element 14 is electrically connected via the electrically conductive adhesive 16.

By employing the above-described structure, in the chip type capacitor according to the present invention, bond strength between the anode lead wire 14a and the anode terminal 11 is improved as compared with a conventional chip type capacitor. Accordingly, the chip type capacitor according present invention is less likely to have so-called "open defectiveness" and has improved reliability as a part.

From the view point of reducing possibility of occurrence of "open defectiveness", it is preferred that about 90% or more of a periphery of a section of the anode lead wire 14a in the direction substantially perpendicular to the extending direction of the anode lead wire 14a be covered with the solidified matter 116.

Further, from the viewpoint of improvement and stability of bond strength, it is particular preferred that the solidified matter 116 and the anode lead wire 14a be diffusively bonded and the solidified matter 116 and the anode terminal 11 be diffusively bonded, and as a result, a diffusion layer 12 be formed.

To form the solidified matter 116, a melt may be supplied by melting a portion of the anode terminal 11 or may be externally supplied and the melt is allowed to solidify. 116 is supplied by melting a portion of the anode terminal 11, there is an advantage that the melt is stably supplied, and further, there is a manufacturing advantage that preparation steps are simplified. In this case, when the material of the anode terminal is capable of easily forming a diffusion layer in connection with the material of the anode lead wire 14a, the solidified matter 116 is further firmly bonded to the anode lead wire by virtue of the presence of the diffusion layer. Accordingly, in addition to the above-described advantages, there is an advantage that a chip type capacitor which is less likely to have "open defectiveness" is obtained.

On the other hand, in the case where a melt is externally supplied, there is an advantage that a range of selection of the material is broad. For example, even if a material of the anode terminal 11 and a material of the anode lead wire 14a are not capable of easily forming a diffusion layer in connection with each other, bond strength between the anode terminal 11 and the anode lead wire 14a may be increased by externally supplying a melt of a material capable of easily forming a diffusion layer in connection with the materials of the anode terminal 11 and the anode lead wire 14a. As the material capable of easily forming a diffusion layer, there may be mentioned a material containing the same component as in the materials of the anode terminal 11 and the anode lead wire 14a, a material containing a component capable of easily diffusing into the materials of the anode terminal 11 and the anode lead wire 14a, and a material into which a component or components of materials of the anode terminal 11 and the anode lead wire 14a may easily diffuse. The component diffused in the other phase or other phases may form an alloy or a solid solution.

Subsequently, description will be given with respect to the anode terminal 11 used for preparing the chip type capacitor according to the present invention with reference to FIGS. 3 to 5.

Figure 3:
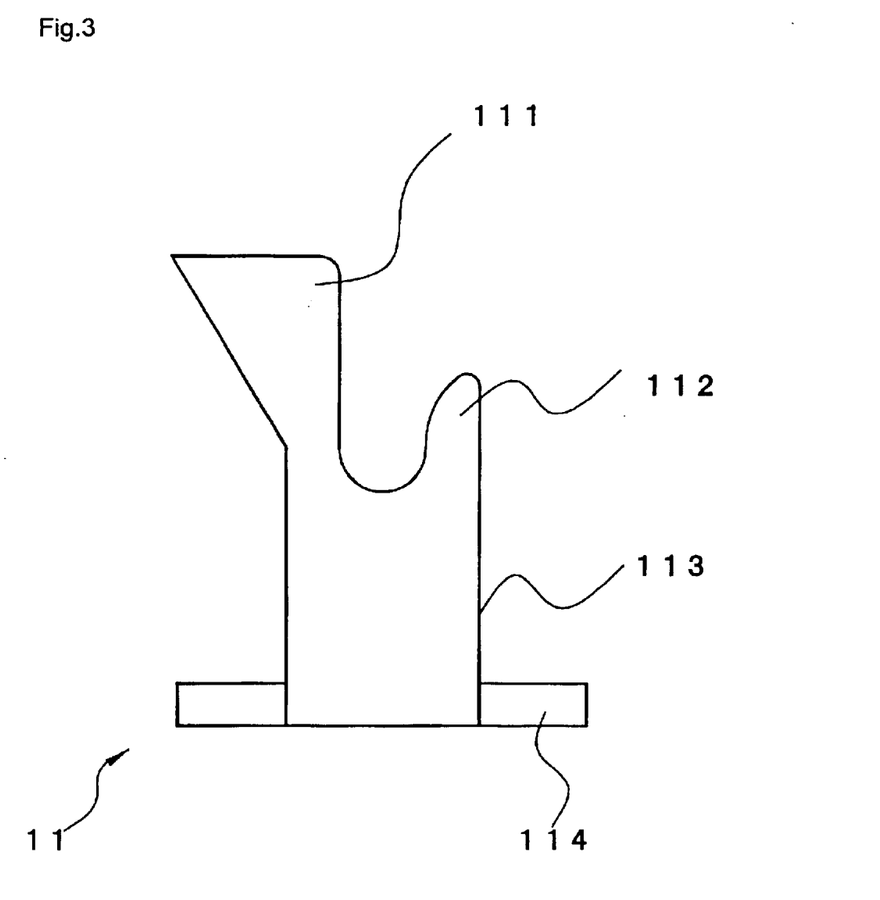
FIG. 3 is a front view schematically showing an embodiment of the anode terminal used for preparing the chip type capacitor according to the present invention.
Figure 4:
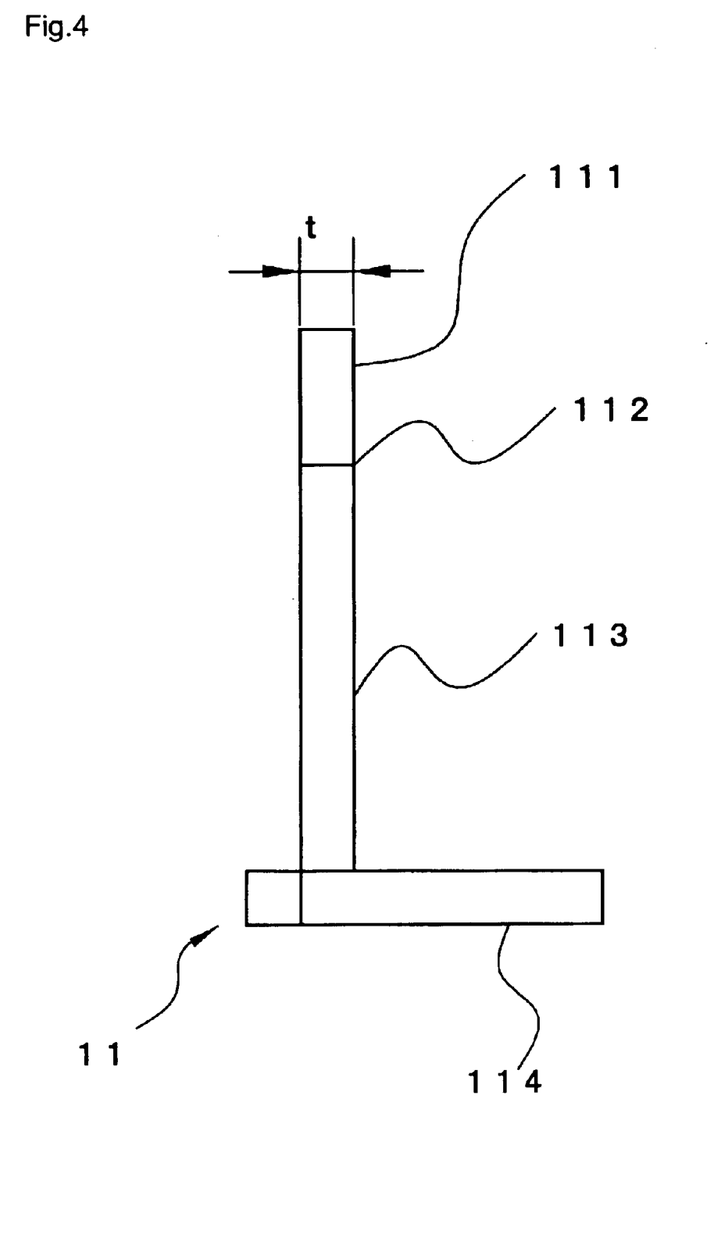
FIG. 4 is a right side view schematically showing the embodiment of the anode terminal used for preparing the chip type capacitor according to the present invention.

FIG. 3 is a front view schematically showing an embodiment of the anode terminal used for preparing the chip type capacitor according to the present invention, and FIG. 4 is a sectional side view of the embodiment viewed from the right.

The anode terminal 11 is a piece formed by press working of a plate having a thickness of t. The anode terminal 11 has a bottom portion 114 for connection with an external substrate or the like and a connecting portion 113 standing upward by bending at an angle of approximately 90° relative to the bottom portion 114.

In this embodiment, as the material for the anode terminal, a Ni(42%)—Fe alloy (so-called "42 alloy") which is solder-plated is used. However, other materials than this may be used. For example, copper alloys such as a Cu—Ni—Zn alloy, e.g., a German silver (45–65% Cu, 6–35% Ni, and 15–35% Zn), and a phosphor bronze (e.g., 95% Cu, 5% Sn, and 0.2% P) may be used. Further, the material for the plating may contain silver with a view to improving bonding properties.

The connecting portion 113 is provided with a pair of substantially flat protrusions 111 and 112 and, therebetween, a recess 113E for resting the anode lead wire 14a thereon. These protrusions are provided for stabilizing the resting of the anode lead wire 14a on the recess and as a source for supplying the melt to weld the connecting portion 113 and the anode lead wire 14a together.

In this embodiment, the anode terminal 11 is a piece formed by press working of a plate having a thickness of t. Accordingly, the protrusions 111 and 112 are substantially flat. However, each of the protrusions may not be flat and may have any shape so long as a melt derived therefrom is efficiently supplied to the upper surface portion of the anode lead wire 14a rested on the recess 113 in the subsequent step of melting.

The configuration of the connecting portion 113 of the anode terminal 11 according to the present invention will be described in more detail with reference to FIGS. 5(a) to 5(c). FIGS. 5(a) to 5(c) are fragmentary front views schematically showing shapes of the protrusions and the recess of the anode terminal used for preparing the chip type capacitor according to the present invention, respectively.

Now, explanation will be given with respect to several terms used in the following description.

"Anode lead wire level Lv14a" means the level of the top of the anode lead wire 14a with the anode lead wire 14a rested on the recess 113E of the connecting portion 113. In other words, the anode lead wire level Lv14a means the level above the bottom of the U-shape of the recess 113E shown in FIG. 5(c) by the diameter of the anode lead wire 14a.

"Lower part 113B of the connecting portion" means the part of the connecting portion below the anode lead wire level [Lv14a shown in FIGS. 5(a) and 5(b)]. "The protrusions 111, 112" mean the parts of the connecting portion above the anode lead wire level.

"Heights H1, H2 of the protrusions":

The shape of the protrusion 111 which is used as a material for covering the upper surface portion of the anode lead wire in this embodiment is shown in FIG. 5(a).

The protrusion 111 is provided for covering the upper surface portion of the anode lead wire by melting the protrusion itself and is so formed as to protrude from the anode lead wire level Lv14a by its height H1.

The anode terminal 11 according to the present invention has its protrusion 111 melted, for example, by a laser beam to weld the connecting portion 113 and the anode lead wire 14a together, as described below. Accordingly, the height Hi of the protrusion 111 is in a range which is determined based on the focal length of the laser beam that is used to melt the protrusion 111 itself and on the volume of the protrusion 111. Specifically, the range is determined taking into consideration the following formula (1) showing relationship among widths W1, W2 (described below) of the protrusion 111 and the thickness t of the plate, and factor of safety α (>1) of the covering of the upper surface portion of the anode lead wire and volume V of the covering.

$$(W1+W2) \times H1 \times t \times \frac{1}{2} = V \times \alpha \tag{1}$$

The height H1 of the protrusion 111 is preferably in such a range that a sufficient efficiency of the melting is maintained during the period from initiation to termination of the melting of the protrusion 111 without changing the vertical position of the laser beam source emitting the laser beam, i.e., the focal length of the laser beam.

In a case where only one protrusion 111 is used as the material member for covering the upper surface portion of the anode lead wire 14a, only one position may be heated and the step of melting is thereby the structure of the heating means for melting is simplified. An example of the shape of the other protrusion 112 in the case where only the protrusion 111 is melted is shown in FIG. 5(b).

In the case where only one protrusion 111 is used as the source of the melt, the other protrusion may not necessarily be formed. However, it is preferred that the other protrusion 112 be formed. In other words, the other protrusion 112 is preferably so formed as to have such a height H2 that the top of the protrusion 112 is at a level higher than the anode lead wire level 14a even slightly, thereby obtaining an effect of preventing the melt of the protrusion from flowing down from the upper surface portion of the anode lead wire.

"Widths W1, W2 of the protrusion":

The widths W1 and W2 which specify the shape of the protrusion are defined as follows.

The protrusion 111 has such a shape that its width is gradually increased from the width W1 toward the end surface 111c.

The width W1 is a width of the protrusion 111, which is used for covering the upper surface portion of the anode lead wire, at a level P1 of the center C of the anode lead wire as shown in FIG. 5(a).

The width W2 is, in substance, a width of the end surface 111c of the protrusion 111 and is determined taking into consideration extent of heat transfer with the laser beam with which the protrusion is irradiated and the volume of the protrusion.

Incidentally, the end of the end surface 111c may be beveled from the viewpoint of improvement in manageability, as shown in FIG. 5(a).

Further, in FIG. 5(a), the anode terminal 11 has such a shape that its left side portion relative to the recess is increased in width from a position above the level P1 toward the top of the anode terminal. However, the width may be increased from a position at the level P1 or below the level P1 toward the top of the anode terminal.

"Shape of the lower part of the connecting portion between the protrusions 111, 112":

The lower part 113B of the connecting portion is a part below the anode lead wire level Lv14a. In other words, the lower part of the connecting portion consists of parts below the protrusions 111, 112 and a part therebetween. The lower part 113B of the connecting portion is provided with a recess 113E which conforms to the lower half of the cross-sectional contour of the anode lead wire. In FIG. 5(c), a case is shown where the cross-sectional shape of the anode lead wire is circular. By employing such a configuration, the lower half of the periphery of the anode lead wire is in linear or ribbon-wise contact with the edge of the recess 113E when the anode lead wire is rested on the recess. Accordingly, diffusion bonding by the welding is efficiently effected to thereby obtain a chip type capacitor which is less likely to undergo open deficiency.

Width W3 of gap between the protrusions:

The width W3 is the maximum width of the recess 113E of the connecting portion. When the cross-sectional shape of the anode lead wire is circular, the width W3 is the width of the recess 113E at a level including the center C of the anode lead wire rested on the recess 113E, as shown in FIG. 5(c).

The width W3 preferably includes such an allowance that clearance of about 2 μm to about 50 μm, more preferably about 5 μm to about 20 μm is left between the anode lead wire and the anode terminal when the anode lead wire is rested on the recess 113E of the connecting portion. In other words, the width W3 is preferably about 2 μm to about 50 μm, more preferably about 5 μm to about 20 μm larger than the width of the anode lead wire at the same level. In the case of FIG. 5(c), the width W3 is preferably about 2 μm to about 50 μm, more preferably about 5 μm to about 20 μm larger than the diameter of the anode lead wire. If the clearance is larger than about 50 μm, the anode lead wire is likely to rest unstably on the recess, or melt 111L of the protrusion 111 can be supplied to the clearance between the anode lead wire and the recess 113E of the connecting portion in an amount insufficient for filling the clearance with the melt. Accordingly, it is difficult to stably obtain sufficient bond strength. On the other hand, if the clearance is smaller than 2 μm, it can be difficult to rest the anode lead wire on the recess 113E, or the melt 111L of the protrusion 111 cannot penetrate into the clearance between the anode lead wire and the recess 113E of the connecting portion. Accordingly, in this case also, it is difficult to stably obtain sufficient bond strength.

Positional relationship between the protrusions 111, 112 and the anode lead wire 14a:

The protrusion 111 is located above the level of the anode lead wire 14a, and the anode lead wire 14a is disposed adjacent thereto. Further, the width direction of the end surface 111c at the top of the protrusion 111, i.e., the thickness direction of the protrusion 111 and the longitudinal direction of the anode lead wire 14a are orthogonal to each other.

By this arrangement, when the protrusion 111 is melted in the laser beam welding, the melt 111L flows down by gravity to cover the upper surface portion of the anode lead wire 14a. In this connection, the direction in which the melt 111L flows down can be controlled by changing the position at which the protrusion is irradiated with a ? laser beam or intensity of the irradiation.

The protrusion 111 preferably has its side end surface 111a which extends tangentially relative to the anode lead wire 14a formed in a linear shape geometry extending in the vertical direction so that the upper surface portion of the anode lead wire 14a is efficiently covered with the melt 111L of the protrusion 111 which flows down by gravity in the laser beam welding.

Further, when the protrusion 111 is melted using a laser beam, the protrusion 111 is irradiated with the laser beam from above. Accordingly, also from the viewpoint that the protrusion 111 does not intercept the laser beam from the anode lead wire 14a, the tangential side end surface 111a is formed preferably in a linear shape geometry extending in the vertical direction.

As the source of the melt for covering the upper surface portion of the anode lead wire therewith, both the protrusions 111, 112 may be used. In this case, shapes and sizes of the protrusions are so determined as to enable the volume of the melt derived from the protrusions to cover the upper surface portion of the anode lead wire.

In this embodiment, the protrusion 111 is melted with a laser beam. Besides a laser beam, however, an electron beam, an ion beam or arc discharge may be employed to melt the protrusion.

Subsequently, the method for preparing a chip type capacitor which uses the above-described anode terminal 11 will be described.

Method for preparing a chip type capacitor Steps of the preparation of the chip type capacitor will be described with reference to FIGS. 1 and 2.

Preparation of capacitor element 14 (Step 11: S11)

(i) A Ta-based powder is prepared, and an anode lead wire 14a is partially inserted in the Ta-based powder. The Ta-based powder with the anode lead wire partially inserted therein is pressed into a rectangular parallelepipedonal shape and then sintered under vacuum to form a Ta porous body.

(ii) An oxidized Ta layer is formed as a dielectric layer over the surface of the Ta porous body by anodic oxidation.

(iii) On the oxidized Ta layer formed over the surface of Ta porous body, a solid electrolyte layer and a graphite layer and a silver(Ag) paste layer are sequentially formed.

Preparation of anode terminal 11 and cathode terminal 13 (Step 12: S12)

A band plate (lead frame material) made of a solder-plated 42 nickel alloy is subjected to continuous press working to prepare anode terminals 11 and cathode terminals 13. In the press working, punching and bending are performed as follows.

(i) Punching

Contours of anode terminals 11 and cathode terminals are formed continuously by punching in such an arrangement that a pair of an anode terminal 11 and a cathode terminal 13 which will be incorporated in the same capacitor are in the width direction of the lead frame and that a plurality of pairs of an anode terminal 11 and a cathode terminal 13 are in the longitudinal direction of the lead frame (progressive punching press). At this stage, a bottom portion 114 and a connecting portion 113 of each of the anode terminals 11 and a bottom portion 131 and a mounting portion 132 of each of the cathode terminals 13 are coplanar with each other on the same plane, and each of the bottom portions 114, 131 are unseparated form the lead frame.

The contour of the anode terminal 11 is as described above, and the contour of the cathode terminal 13 is basically such a simple rectangular shape that the bottom portion 131 and the mounting portion 132 stretch in a line.

(ii) Bending

In the cathode terminal 13, the bending is so effected as to form a step between the bottom portion 131 and the connecting portion 132.

In the anode terminal 11, the connecting portion 113 is bent in an angular amount of approximately 90° relative to the bottom portion 114.

Connecting the cathode terminal 13 to the capacitor element 14 (Step 13: S13)

An electrically conductive adhesive 16 is applied onto the mounting portion 132 of the cathode terminal 13, and the capacitor element 14 is placed thereon to electrically connect the cathode terminal 13 to the peripheral layer, i.e., the cathode of the capacitor element 14 via the electrically conductive adhesive 16.

Bonding of anode terminal to the capacitor element by laser beam welding which is to be subsequently performed will be described with reference to FIGS. 6 and 7.

Figure 6:
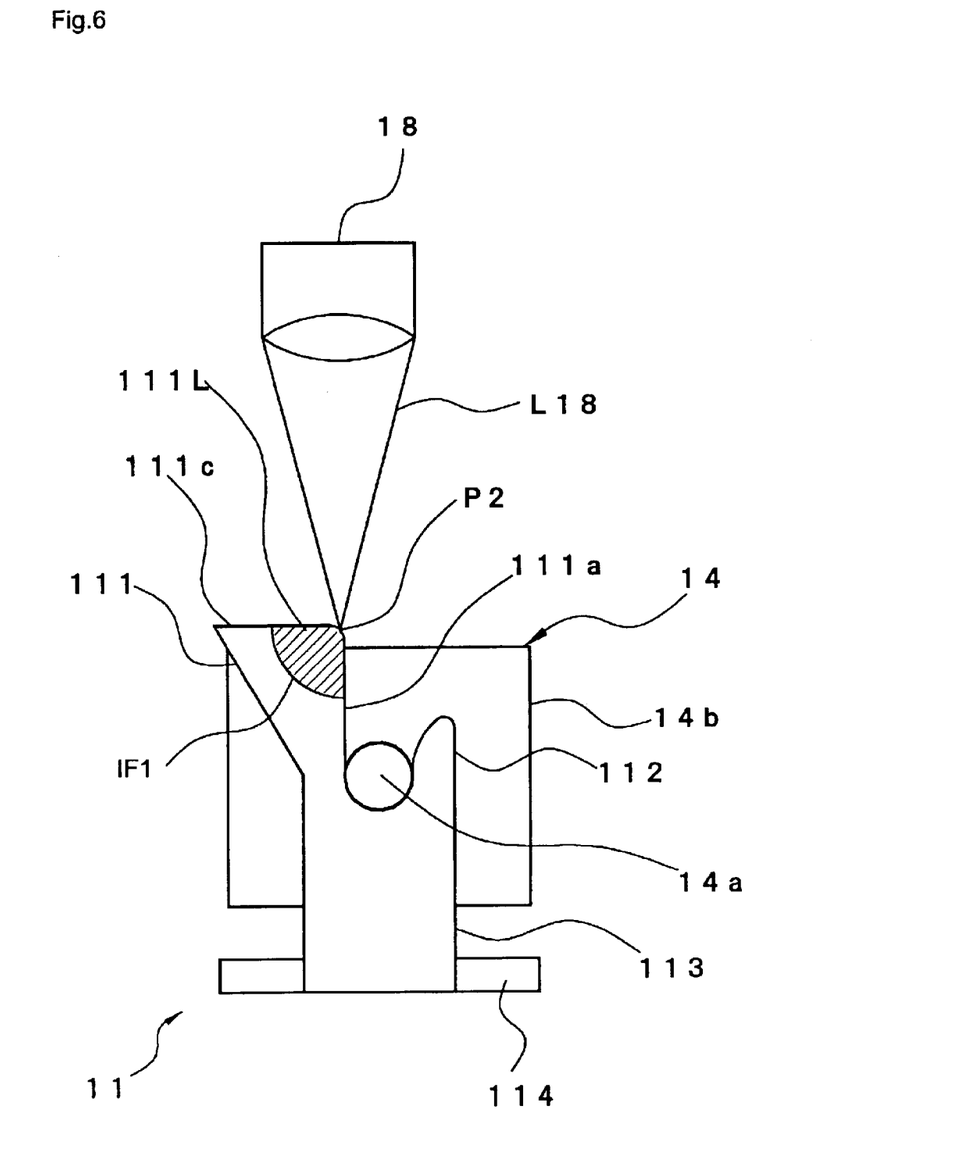
FIG. 6 is a structural front view schematically showing state of the anode terminal according to the present invention with an anode lead wire resting thereon at the time of initiation of laser beam welding.
Figure 7:
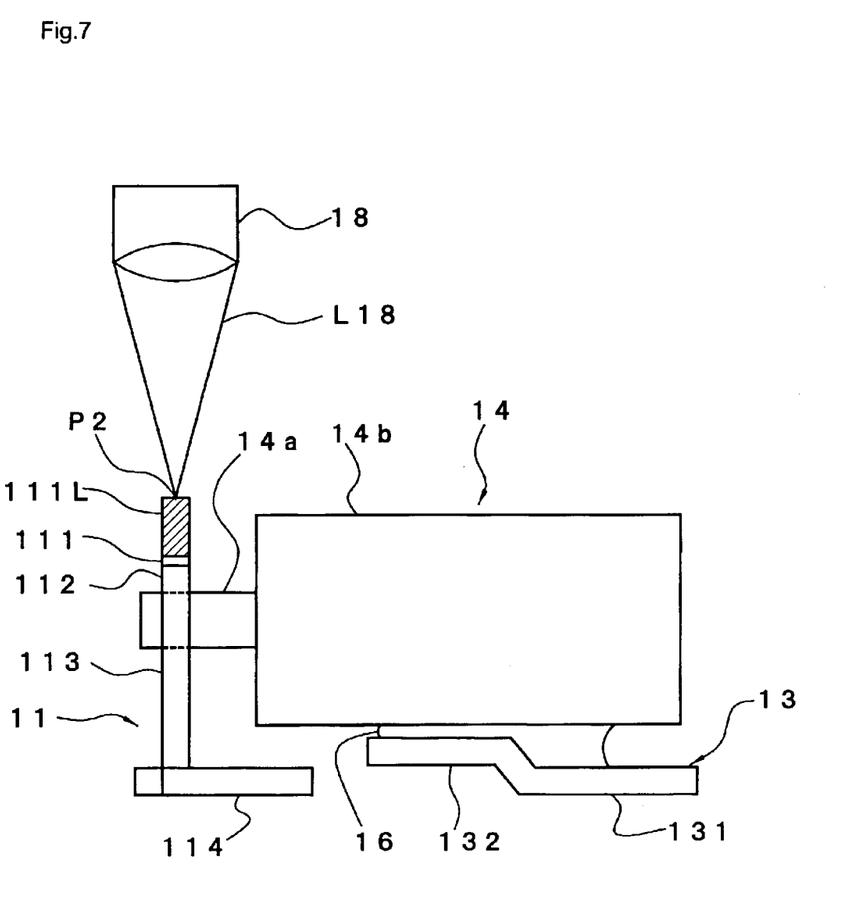
FIG. 7 is a structural right side view schematically showing the state of the anode terminal according to the present invention with the anode lead wire resting thereon at the time of initiation of laser beam welding.

FIG. 6 is a structural front view schematically showing state of the anode terminal according to the present invention with an anode lead wire resting thereon at the time of initiation of the laser beam welding, and FIG. 7 is a structural right side view schematically showing the same.

In the preparation method according to the present invention, (a) position of irradiation, (b) focal length and depth of focus, (c) laser power, (d) pulse, and (e) irradiation time may be mentioned as conditions of the laser beam welding. Of these conditions, (a) position of irradiation is particularly important. Accordingly, position of irradiation will be described in detail.

(a) Position of Irradiation i) Irradiation of the Protrusion

Referring to FIG. 6, the protrusion 111 is irradiated with a laser beam L18 from laser irradiation equipment 18 at a position P2 in the top end surface 111c which point is nearer to the recess-proximal end than the recess-distal end of the top end surface 111c.

It is preferred that the position P2 be slightly apart from the recess-proximal end of the top end surface 111c. Specifically, the position P2 is apart from the recess-proximal end of the top end surface 111c by preferably about 2% to about 50%, more preferably about 3% to about 10% of the width W2 of the top end surface 111c. By irradiating the protrusion 111 at a position in the above-mentioned range, the melt 111L of the protrusion is efficiently supplied to the upper surface portion of the anode lead wire 14a. Referring to FIG. 7, in the thickness direction of the protrusion 111, the protrusion is irradiated preferably at the center of the thickness thereof.

By the irradiation with the laser beam at the position P2, a portion of the protrusion 111 around the position P2 is heated to melt. FIG. 6 shows the state at the initial stage of the melting. A portion of the protrusion within the area of which border is equidistant from the position P2 of irradiation is heated into a melt 111L as a liquid phase, and the interface IF1 between the melt as a liquid phase and the other portion as a solid phase of the protrusion makes a characteristically curved slope from the top of the protrusion 111 toward the anode lead wire 14a. Accordingly, the melt 111L flows down toward the anode lead wire 14a to cover the upper surface portion of the anode lead wire. While covering the upper surface portion of the anode lead wire, the melt cools and solidifies.

By continuing the irradiation of the protrusion 111 with the laser beam L18, the melted area is further expanded, and the resulting melt 111L flows down to the anode lead wire 14a. The "melting-flowing down" is continuously advanced. Finally, the protrusion 111 is melted substantially in whole, and the resulting melt flows down toward the anode lead wire 14a to cover the upper surface portion of the anode lead wire.

ii) Irradiation of the Anode Lead Wire 14a

The anode lead wire 14a as well as the protrusion 111 is irradiated with the laser beam L18 from the laser irradiation equipment 18 to heat a portion of the anode lead wire 14a. The area of the anode lead wire which is subjected to the irradiation with the laser beam thereby has an elevated temperature, and the surface of the anode lead wire in the area is activated and improved in wettability with the melt 111L. In consequence, the melt 111L efficiently cover the upper surface portion of the anode lead wire 14a.

In the heating, the temperature for heating the surface of the anode lead wire 14a is preferably the melting point of the protrusion 111 (,i.e., the solidifying point of the melt 111L) or higher and lower than the melting point of the anode lead wire 14a.

To improve the wettability of the anode lead wire 14a with the melt 111L, a higher heating temperature yields a better result. However, if the anode lead wire 14a is considerably melted, it can be adversely affected to ensure a satisfactory electrical connection between the capacitor element and the anode terminal. Accordingly, the heating temperature is preferably lower than the melting point of the anode lead wire 14a. Specifically, when the anode terminal 11 is made of a 42 alloy, the heating temperature is preferably in a range of about 1,400° C. or higher and lower than about 3,000° C. with respect to a Ta anode lead wire and in a range of about 1,400° C. or higher and lower than about 2,500° C. with respect to an Nb anode lead wire.

The anode lead wire 14a and the protrusion 111 may be irradiated with a laser beam L18 from a single laser beam source.

In such a case, the irradiation may be carried out with a laser beam L18 having an enlarged light flux which allows the anode lead wire 14a and the protrusion 111 to be targeted in the vicinity of the laser beam.

According to this method, the heating for melting the protrusion 111 and the heating for improving wettability of the anode lead wire 14a may be conducted without using a complicated optical system. Further, efficiency of use of laser energy is improved. In this method also, the protrusion 111 is irradiated with the laser beam L18 at a position apart from the recess-proximal end of the top end surface 111c by preferably about 2% to about 50%, more preferably about 3% to about 10% of the width W2 of the top end surface 111c.

Further, irradiation may be conducted by scanning the laser beam L18 between the irradiation point P2 of the protrusion 111 and a target area on the anode lead wire 14a, i.e., by alternately irradiating the protrusion 111 at the irradiation point P2 and the target area on the anode lead wire 14a.

Alternatively, a laser beam from a single laser beam source may be split to irradiate the protrusion 111 at the irradiation point P2 and the target area on the anode lead wire 14a with split laser beams.

(b–e) Other conditions

With respect to a depth of focus, with a view to reducing energy variation over a period of the laser beam welding step, an optical system is preferably so set as to emit a laser beam L18 with a large depth of focus. For example, numerical aperture (NA) of a lens may be reduced to thereby obtain a large depth of focus so long as any undesirable effect is not caused. A focal length, laser power, pulse, and a irradiation time are determined taking into consideration the shape and the material of the protrusion 111. Specifically, these conditions are preferably so determined that the protrusion 111 is irradiated into a melt 111L stably without bumping and the melt 111L is supplied to the upper surface portion of the anode lead wire 14a.

When both of the protrusions 111 and 112 are used as sources of a melt for covering the upper surface portion of the anode lead wire 14a, a laser beam L18 is applied to each of the protrusions.

The state of the bond between the anode lead wire 14a and the connecting portion 113 when the above-described laser beam welding step has finished is schematically shown in FIG. 1.

As shown in FIG. 1, the protrusion 111 has already been melted by the laser beam welding to cover the upper portion of the anode lead wire with the resulting melt. As a result, 75% or more of a periphery of a section of the anode lead wire 14a in the direction substantially perpendicular to the direction in which the anode lead wire extends from the capacitor body 14b is covered with solidified matter 116.

Further, owing to the heat of solidification of the melt 111L and the heating of the anode lead wire 14a with the laser beam L18, diffusion proceeds between the anode lead wire 14a and the solidified matter 116 and between the anode lead wire 14 a and the connecting portion 113 to form a diffusion layer 12 man area where the anode lead wire 14 a is covered. By virtue of the formation of the diffusion layer 12, the junctional area 115 where the anode lead wire 14 a and the connecting portion 113 are bonded to each other has extremely high bond strength. When the anode lead wire 14 a is made of Ta and the anode terminal 11 is made of a solder-plated Ni(42%)-Fe alloy plate, the diffusion layer 12 contains Ta, Ni, Fe and Sn as main components.

After the above-described laser beam welding, a chip type capacitor as shown in FIG. 2 is completed through conventional subsequent preparation steps.

The chip type capacitor prepared by the above-described preparation method has a larger junctional area 115 and higher bond strength of the junctional area 115 as compared with a conventional chip type capacitor. Accordingly, the chip type capacitor according to the present invention is less likely to have so-called "open defectiveness" and highly reliable as a part.

EXAMPLES

The following Examples are given by way only of illustrations for more clear understanding of the present invention. It is, therefore, to be understood that the scope of the present invention is by no means restricted to these specific Examples.

Example 1

Through the following procedure, a chip type capacitor which was not yet subjected to a step of sheathing by molding (a semifinished chip type capacitor) was prepared.

Using conventional technique, a capacitor element having a Ta anode body was prepared which had a rectangular paralellepipedonal shape of 1.6 mm in length, 0.85 mm in width and 0.8 mm in height and which is provided with a Ta anode lead wire having a diameter of 0.15 mm.

Figure 5:
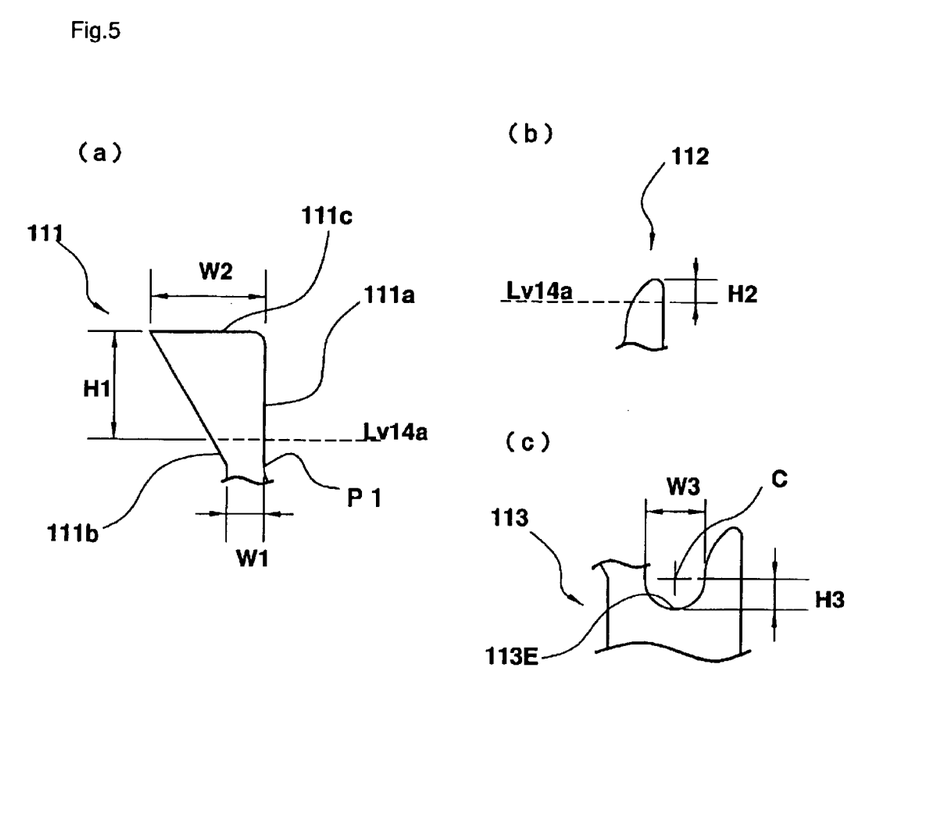
FIGS. 5(a) to 5(c) are fragmentary front views schematically showing shapes of protrusions and a recess of the anode terminal used for preparing the chip type capacitor according to the present invention, respectively.

On the other hand, an anode terminal having a shape as shown in FIGS. 3 to 5 and a cathode terminal having a shape as shown in FIG. 2 were prepared. Each of them was made of a nickel(42%)-iron alloy plate (solder-plated). Specific dimensions with respect to the protrusion of the anode terminal were as follows.

(i) width W1: 0.1 mm
(ii) height H1: 0.24 mm
(iii) width W2: 0.3 mm
(iv) width W3: 0.15 mm (+allowance of 0.01 mm)
(v) thickness t of the plate: 0.08 mm Then, the Ta capacitor element and the cathode terminal were bonded together with an electrically conductive adhesive, and the anode lead wire of the Ta capacitor element was rested on a recess of a connecting portion of the anode terminal. The maximum width of clearance between the anode lead wire and the recess of the connecting portion after the anode lead wire was rested on the recess was 0.01 mm (10 μm) as the above-mentioned allowance was provided.

Subsequently, the top end surface of the protrusion and the upper surface portion of the anode lead wire were irradiated with about 0.3J of a laser beam having a radius of light flux of 0.3 mm at the focal point so as to concurrently irradiate two of them with the laser beam. The center position at which the top end surface of the protrusion was irradiated was a position 0.015 mm apart from the recess-proximal end of the top end surface, and it was the center of the top end surface in the thickness direction of the protrusion. The temperatures of the heating by the irradiation with the laser beam were about 1,500° C. and about 1,800° C. with respect to the protrusion and the anode lead wire, respectively. The temperature at the protrusion was lower than that at the anode lead wire because of the heat of fusion at the protrusion.

As a result, the protrusion of the anode terminal was melted by the irradiation with the laser beam, and the resulting melt was allowed to flow toward the anode lead wire to substantially cover the anode lead wire therewith and then solidified.

Of the semifinished chip type capacitors obtained by the above-described preparation method, 20% were evaluated to be defective on the grounds that the melt had not been supplied to the intended position.

With respect to the semifinished chip type capacitors evaluated to be non-defective, average percentage of covering the periphery of the section of the anode lead wire in the direction substantially perpendicular to the extending direction of the anode lead wire with the solidified matter resulting from the solidification of the melt of the protrusion of the anode terminal was about 95%.

Example 2

Each of semifinished chip type capacitors were prepared in the same manner as in Example 1 except that a top end surface of a protrusion and an anode lead wire were irradiated with a laser beam by scanning the laser beam.

In any of the thus obtained 33 semifinished chip type capacitors, a melt was supplied to the intended place.

With respect to the semifinished chip type capacitors, average percentage of covering the periphery of the section of the anode lead wire in the direction substantially perpendicular to the extending direction of the anode lead wire with the solidified matter resulting from the solidification of the melt of the protrusion of the anode terminal was about 95%.

Comparative Example 1

Anode terminals were prepared which had the same shape as of the anode terminal used in Example 1 except that H1 was 0 mm and W2 was 0.1 mm and H2 was 0 mm.

Using an anode terminal of this type, each of semifinished chip type capacitors was prepared in the same manner as in Example 1 except that each of the portions on the both sides of the recess was irradiated with about 0.3J of a laser beam at a target position 0.015 mm apart from the recess-proximal end of the top end surface thereof.

Of the 40 semifinished chip type capacitors prepared by the above-described method, 7 capacitors (about 20%) were evaluated to be defective on the grounds that a melt had not been supplied to the intended position.

With respect to the semifinished chip type capacitors evaluated to be non-defective, average percentage of covering the periphery of the section of the anode lead wire in the direction substantially perpendicular to the extending direction of the anode lead wire with the solidified matter resulting from solidification of the melt of the protrusion of the anode terminal was about 65%.

Measurement of Bond Strength

Figure 8:
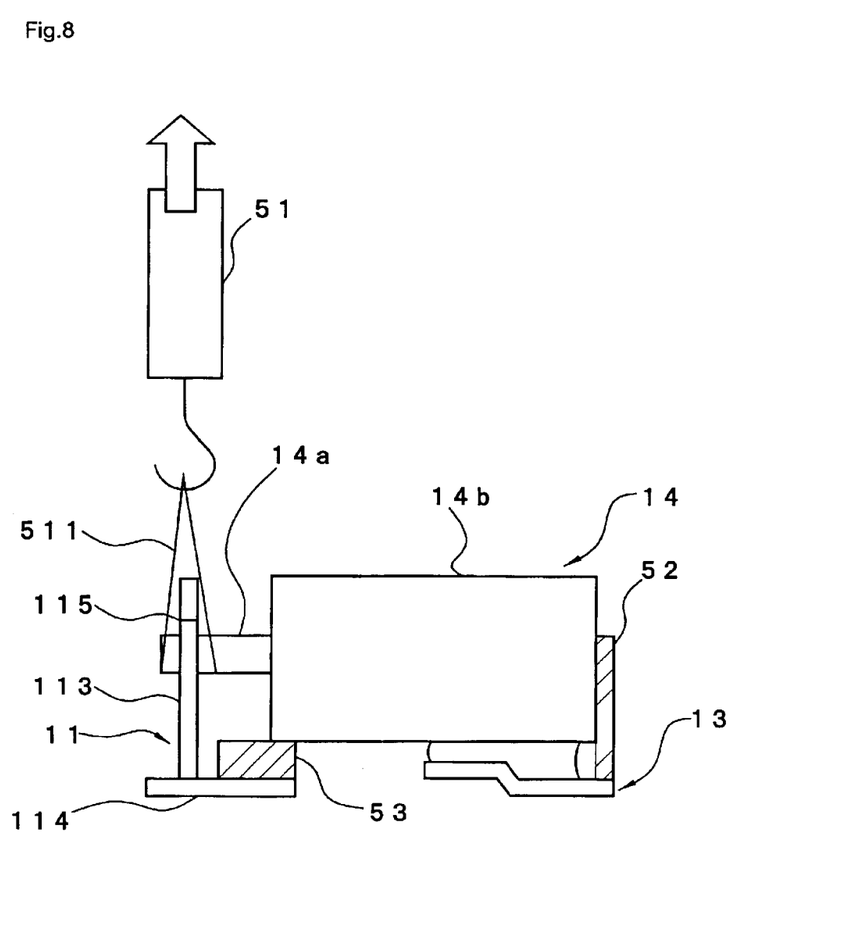
FIG. 8 is a structural right side view schematically showing a method for measuring bond strength between an anode terminal and than anode lead wire with respect to a semi-finished product of the chip type capacitor according to the present invention.

Of the semifinished products prepared in Examples 1 and 2 and Comparative Example 1, bond strength between the capacitor element and the anode lead wire was measured with respect to each of the semifinished products evaluated to be non-defective. A method for the measurement will be described with reference to FIG. 8. FIG. 8 is a structural right side view schematically showing a method for measuring bond strength between the anode terminal and the anode lead wire with respect to the semifinished product of the chip type capacitor according to the present invention.

First, the capacitor element 14 and the cathode terminal 13 were fixed to each other by a fixing means 52 provided therebetween, and the capacitor element 14 and the bottom portion 114 of the anode terminal 11 are fixed to each other by a fixing means provided therebetween. Bond strengths by the fixing means 52, 53 were set to be sufficiently greater than the bond strength between the capacitor element 14 and anode terminal 11.

Subsequently, the anode lead wire 14a was held by a wire 511, and the wire was connected to a measuring device 51. The measuring device 51 was pulled upward until the bond between the capacitor element 14 and the anode terminal 11 was broken. The force at the time of the breakage was determined as the bond strength.

With respect to each of Examples 1 and 2 and Comparative Example 1, bond strengths of 33 semifinished products were measured.

As a result, the bond strengths were 2.5N on average with respect to each of Examples 1 and 2 and 1.9N on average with respect to Comparative Example 1.

What is claimed is:

1. An anode terminal used for preparing a chip type capacitor comprising a solid electrolytic capacitor element including an element body having an anode body, a dielectric and a cathode body, and an anode lead wire partially extending from the anode body of the element body, said anode terminal comprising:

a recess configured for resting the extending portion of the anode lead wire; and at least one protrusion located beside the recess and above a level coinciding with a top of the extending portion of the anode lead wire when the anode lead wire is rested on the recess, wherein said protrusion is configured to be melted to supply a resulting melt to an upper surface portion of the extending portion of the anode lead wire, so that when said melt solidifies, the anode terminal is fixedly connected to the anode lead wire to form a bond and an electrical connection.

2. The anode terminal according to claim 1, wherein the recess has a width including such an allowance that when the extending portion of the anode lead wire is rested on the recess, clearance therebetween is about 2 $\mu$m to about 50 $\mu$m.

3. The anode terminal according to claim 1, wherein the recess has a width including such an allowance that when the extending portion of the anode lead wire is rested on the recess, clearance therebetween is about 5 $\mu$m to about 20 $\mu$m.

4. The anode terminal according to claim 1, wherein the protrusion is so provided as to allow the melt of the protrusion to flow down by gravity, thereby supplying the melt to the upper surface portion of the extending portion.

5. The anode terminal according to claim 1, wherein the protrusion has a trapezoidal shape of which the width increases from the bottom to the top and of which the side proximal to the recess upward extends substantially tangentially to the recess.

6. A chip type capacitor prepared by a method for preparing a chip type capacitor comprising a solid electrolytic capacitor element having an anode lead wire partially extending therefrom, said method using an anode terminal having a recess for resting the extending portion of the anode lead wire and at least one protrusion located beside the recess and above a level of a top of the extending portion of the anode lead wire when the extending portion is rested thereon, said method comprising:

resting the extending portion of the anode lead wire on the recess in such a manner that the anode lead wire is substantially perpendicular to the recess of the anode terminal;

melting the protrusion by a means for heating to form a melt;

allowing the melt to flow down by gravity to supply the melt to the upper surface portion of the extending portion of the anode lead wire; and allowing the melt to solidify to bond the extending portion of the anode lead wire and the anode terminal to each other with the resulting solidified matter, wherein the melt is supplied to the upper surface portion of the anode lead wire while heating the upper surface portion of the anode lead wire by a means for heating.

7. The chip type capacitor according to claim 6, wherein the means for heating the upper surface portion of the anode lead wire is the same heating means as for melting the protrusion.

* * * * *